United States Patent
Jensen et al.

(10) Patent No.: US 9,051,919 B2
(45) Date of Patent: Jun. 9, 2015

(54) MOUNTING OF VORTEX GENERATOR DEVICES VIA MOUNTING PLATE

(75) Inventors: Lars Erik Jensen, Hedensted (DK); Hans Tommerup Knudsen, Grenå (DK); Jesper Madsen, Gesten (DK)

(73) Assignee: LM Windpower A/S, Kolding (DK)

( * ) Notice: Subject to any disclaimer, the term of this patent is extended or adjusted under 35 U.S.C. 154(b) by 658 days.

(21) Appl. No.: 13/364,467

(22) Filed: Feb. 2, 2012
(Under 37 CFR 1.47)

(65) Prior Publication Data
US 2012/0257978 A1 Oct. 11, 2012

(30) Foreign Application Priority Data
Feb. 4, 2011 (EP) ..................................... 11153351

(51) Int. Cl.
*F03D 1/06* (2006.01)

(52) U.S. Cl.
CPC ......... *F03D 1/0608* (2013.01); *Y10T 29/49318* (2015.01); *F05B 2240/122* (2013.01); *F05B 2240/30* (2013.01); *Y02E 10/721* (2013.01)

(58) Field of Classification Search
CPC ............. F03D 1/0608; F05B 2240/122; F05B 2240/30; Y02E 10/721
USPC .............. 244/200.1; 415/914; 416/62, 223 R, 416/235, 236 R
See application file for complete search history.

(56) References Cited

U.S. PATENT DOCUMENTS

| | | | |
|---|---|---|---|
| 6,412,853 B1 * | 7/2002 | Richardson | 296/180.1 |
| 7,914,259 B2 * | 3/2011 | Godsk | 416/146 R |
| 7,927,070 B2 * | 4/2011 | Godsk et al. | 416/62 |
| 8,162,590 B2 * | 4/2012 | Haag | 415/4.3 |
| 8,746,053 B2 * | 6/2014 | Brake et al. | 73/147 |
| 2012/0257977 A1 * | 10/2012 | Jensen et al. | 416/223 R |
| 2012/0257978 A1 * | 10/2012 | Jensen et al. | 416/223 R |
| 2012/0257979 A1 * | 10/2012 | Jensen et al. | 416/223 R |

FOREIGN PATENT DOCUMENTS

| | | |
|---|---|---|
| DE | 197 46 144 A1 | 4/1998 |
| DE | 298 15 737 U1 | 12/1998 |
| EP | 0 947 693 A2 | 10/1999 |
| WO | 00/15961 A1 | 3/2000 |
| WO | 2006/122547 A1 | 11/2006 |
| WO | 2007/140771 A1 | 12/2007 |
| WO | 2008/113350 A2 | 9/2008 |

OTHER PUBLICATIONS

European Search Report cited in European Application No. 11153351.9 dated Jul. 14, 2011, four (4) pages.

* cited by examiner

*Primary Examiner* — Edward Look
*Assistant Examiner* — Christopher R Legendre
(74) *Attorney, Agent, or Firm* — Nath, Goldberg & Meyer; Tanya E. Harkins; Sanjana Mangalagiri

(57) ABSTRACT

A method of retrofitting flow-altering devices to an outer surface of a wind turbine blade is disclosed. The flow-guiding devices are of the type having a base comprising an inner side for attaching onto the surface of the wind turbine blade, and an outer side with protruding flow-altering device parts. The method comprises the steps of: a) inserting the protruding flow-altering device parts into a mounting plate so that the inner side of the flow-guiding devices are exposed from a first side of the mounting plate, b) adhering the inner side of the flow-altering devices to the surface of the wind turbine blade by applying the first side of the mounting plate onto an area of application on the surface of the wind turbine blade, and c) removing the mounting plate from area of application on the surface of the wind turbine blade.

16 Claims, 7 Drawing Sheets

Figure 1:
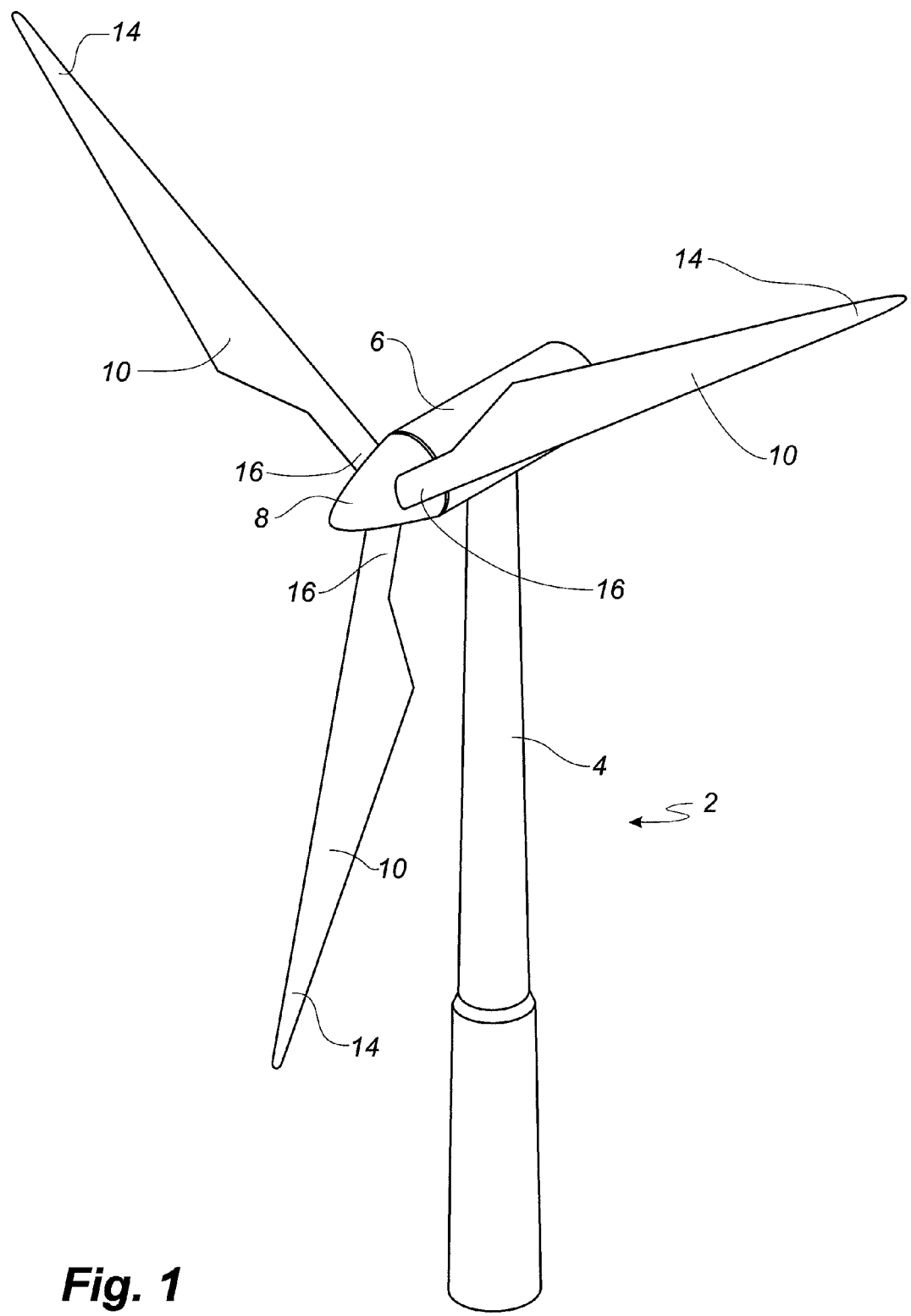

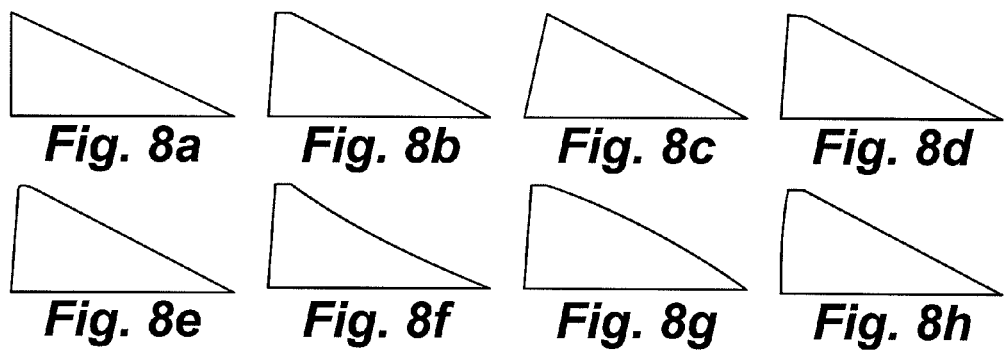
Fig. 8a  Fig. 8b  Fig. 8c  Fig. 8d
Fig. 8e  Fig. 8f  Fig. 8g  Fig. 8h
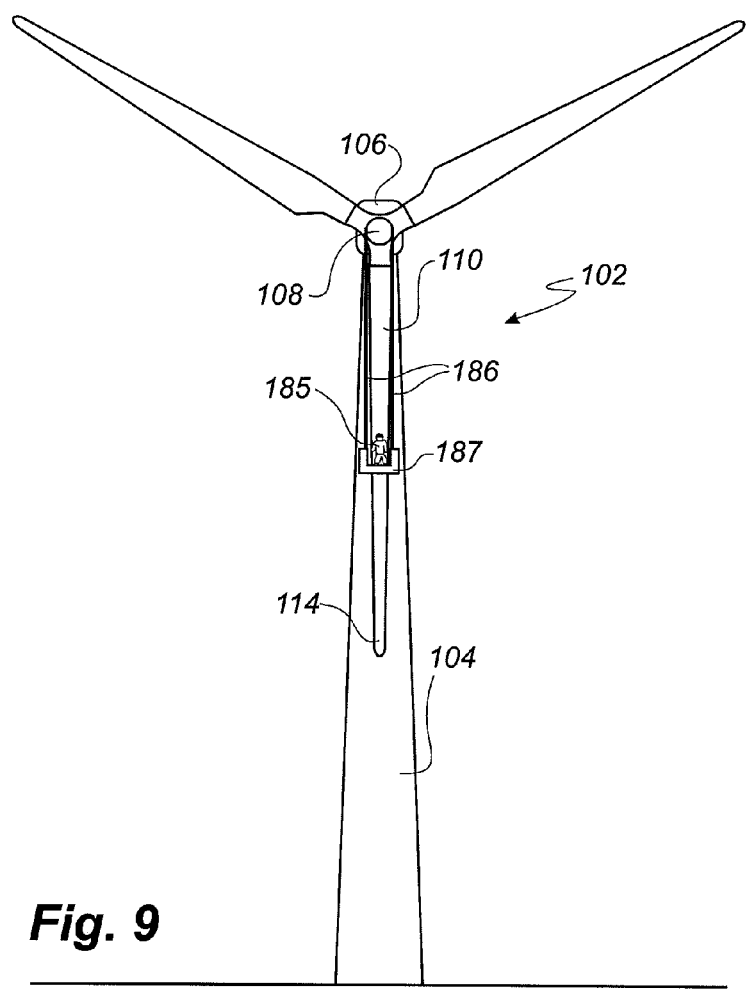
Fig. 9

MOUNTING OF VORTEX GENERATOR DEVICES VIA MOUNTING PLATE

The present invention relates to a method of retrofitting flow-altering devices to an outer surface of a wind turbine blade, the flow-guiding devices being of the type having a base comprising an inner side for attaching onto the surface of the wind turbine blade, and an outer side with protruding flow-altering device parts. The invention also relates to an intermediate product as well as kit of parts for use in the method.

Normally, when installing vortex generator (VG) devices, such as VG strips, on a wind turbine blade, a recess is milled or otherwise cut into the blade, wherein the base plate of the vortex generator strip is inserted so that the top surface of the base plate is substantially flush with the surface of the blade. Accordingly, the base plate of the strip does not protrude from the surface of the blade, whereby the risk of the strip being ripped loose during normal use of the wind turbine blade is reduced. Further the risk of the base plate contributing undesired effects to the flow or causing noise is reduced. However, the attachment method is tedious and for structural reasons it may be undesirable to mill a recess into the surface of the blade. Accordingly, in many aspects, it is desirable to mount the vortex generator strip directly on the surface of the wind turbine blade.

WO2007/140771 describes a solution where a vortex generator strip is mounted directly on the surface of a wind turbine blade, e.g. by use of an adhesive film. A joint area of the vortex generator strip is completely or partially covered by sealing means in order to prevent the vortex generator strip from being ripped off the blade during use. In the document a joint area is defined as the area where the perimeter of the strip meets the surface and where a more or less visible gap between the strip and the blade surface and the surroundings is formed. It is recognised that this solution involves an additional step of sealing the perimeter of the vortex generator strip after the strip has been mounted on the surface of the blade. It is desirable to omit this step when retrofitting vortex generator devices to the surface of the wind turbine blade.

The prior art solutions also does not provide an easy way of handling the vortex generator strip and easily applying the vortex generator strip to the wind turbine blade. This problem is even more prominent when a plurality of devices is to be retrofitted to the surface of the blade.

It is an object of the invention to obtain a method, an intermediate product as well as a kit of parts, which overcome or ameliorate at least one of the disadvantages of the prior art or which provides a useful alternative.

According to a first aspect, the invention provides a method comprising the steps of: a) inserting the protruding flow-altering device parts into a mounting plate so that the inner side of the flow-guiding devices is exposed from a first side of the mounting plate, b) adhering the inner side of the flow-altering devices to the surface of the wind turbine blade by applying the first side of the mounting plate onto an area of application on the surface of the wind turbine blade, and c) removing the mounting plate from area of application on the surface of the wind turbine blade.

Thus, a simple method of retrofitting the flow-altering devices to the surface of the blade is provided. The mounting plate with inserted flow-altering devices may be brought as a single device to for instance the site of a wind turbine provided with wind turbine blades, which are to be retrofitted with flow-altering devices.

The outer side will once mounted on a surface of a wind turbine blade face away from the surface of the wind turbine blade so that the protruding flow-altering device parts protrude from the surface of the wind turbine blade.

According to an advantageous embodiment, the flow-altering devices are vortex generator devices or turbulence-generating devices. The flow-altering devices may for instance be vane vortex generators. Accordingly, the protruding flow-altering device parts may be fins or vanes.

According to another advantageous embodiment, the inner side of the base of the flow-altering devices is provided with an adhesive film, such as a double adhesive tape, which is covered by a peel-off layer, and wherein the method comprises the step of removing the peel-off layer prior to step b). Thereby, the adhesive film may be protected in order to maintain the adhesion of the film until the strip is mounted on a wind turbine blade.

Advantageously, a plurality of flow-guiding devices in step a) is inserted into the mounting plate, the flow-guiding devices being arranged with a predetermined mutual spacing along the mounting plate.

According to another advantageous embodiment, the area of application is prepared for adhesion prior to step a). The area of application may for instance be grinded, polished, sanded or the like, and optionally cleaned afterwards.

According to yet another advantageous embodiment, a masking film is applied to the surface of the wind turbine blade prior to step a), the masking film being provided with openings corresponding to the intended positions of the flow-altering devices on the surface of the wind turbine blade. Thus, it is possible to prepare only the areas, where the flow-altering devices are to be arranged or positioned. Thereby, the grinding, sanding or polishing of the surface will not inadvertently damage surrounding areas on the outer surface of the blade. Further, it is possible to inspect the surface of the blade prior to adhering the flow-altering devices to the surface of the blade in order ensure that the flow-altering devices will be arranged in the correct position.

According to an advantageous embodiment, the masking film comprises markings, such an outer perimeter corresponding to the shape of the mounting plate, which indicates where to position the mounting plate in step b). Accordingly, a surface area of the marking film may be approximately the same size as a surface area of the first side of the mounting plate.

Advantageously, the masking film comprises an inner removal film part surrounding the openings, and the method comprises removal of the inner removal film part prior to step b). Thus, it is ensured that the flow-altering devices will not inadvertently adhere to the masking film instead of to the outer surface of the wind turbine blade. At the same time, the remaining part of the masking film may function as a marker to indicate the correct area for positioning of the mounting plate during step b).

According to one advantageous embodiment, the masking film is removed from the surface of the wind turbine blade after step b). Thus, the masking film may for instance be removed immediately prior to, simultaneous with, or immediately after step c).

In practice, it may be inexpedient to use the masking film due to wind gusts and so forth. Therefore, a mounting reference string may advantageously be arranged on the outer surface of the blade prior to step b). Thus, the mounting plate may for instance be positioned adjacent or substantially abutting the reference string. The reference string can for instance be applied to the surface of the blade by use of tape.

According to another advantageous embodiment, an additional mounting plate comprising additional flow-guiding devices exposed from a first side thereof, and further at an end thereof comprising an opening for receiving a flow-guiding device already mounted on the surface of the wind turbine blade, and wherein the method further comprises the step of inserting the already mounted flow-guiding device into the opening, and subsequently adhering the additional flow-guiding devices in the same manner as step b). Thereby, the additional flow-guiding devices may be arranged in direct extension of the already mounted flow-guiding devices and/or according to a prearranged orientation and spacing between the outermost already mounted flow-guiding device and the adjacent additional flow-guiding device. The opening may of course also be arranged with a corresponding predetermined spacing to an adjacent inserted flow-guiding device.

According to another advantageous embodiment, the method is carried out in situ on a wind turbine blade installed on the rotor of a wind turbine. Of course, the method may also be carried out on a wind turbine blade prior to installing the wind turbine blade on a rotor of a wind turbine, e.g. after manufacture of the wind turbine blade.

In one embodiment, the blade is positioned in a substantially vertical position with a tip end pointed towards the ground, and wherein a worker prior to step b) is hoisted down along the wind turbine blade from a point above the area of application, alternatively hoisted up from a point below the area of application.

According to another embodiment, a worker may use a cherry picker for gaining access to the area of application. The worker may also rappel from a point above the area of application, for instance from the hub.

According to a second aspect, the invention provides an intermediate product for use in the aforementioned method, viz. a mounting plate with flow-altering means.

Accordingly, the invention provides an intermediate product comprising a mounting plate having a first side and a second side, and a number of flow-altering devices comprising a base having an inner side for attaching on the surface of the wind turbine blade, and an outer side with protruding flow-altering device parts, wherein the protruding flow-altering device parts are inserted into the first side of the mounting plate so that the inner side of the flow guiding devices is exposed from a first side of the mounting plate.

In one advantageous embodiment, the mounting plate is at least partially made of a foamed polymer.

In another advantageous embodiment, the flow-altering device is a vane vortex generator or another type vortex generator.

The vortex generator device may be provided with base having, when mounted on an exterior of the wind turbine blade, an inner side for attaching on a surface, such as the exterior of the wind turbine blade, and an outer side facing away from the exterior of the wind turbine blade, the device being provided with a vane vortex generator pair comprising a first vane and a second vane protruding from the outer side of the base. The base may advantageously be trapezium-shaped with a first end and second end as well as a first side and a second side, wherein the first side is longer than the second side, and wherein the first vane is arranged at and substantially parallel to the first end of the base, and the second vane is arranged at and substantially parallel to the second end of the base.

Thus, the invention provides a vane vortex generator pair, which is mutually prearranged, but where the surface area of the base is decreased compared to the prior art, thus obstructing the free flow across the wind turbine blade as little as possible.

Advantageously, the first vane and the second vane are oriented so that they form a mutual angle of 10 to 70 degrees, or 15 to 60 degrees, or 20 to 50 degrees. Accordingly, the first end and the second end of the base may form an angle of a corresponding size.

In a particular advantageous embodiment, the inner side of the base is provided with a recess or undercut for obtaining an adhesive. Thereby, the adhesive, e.g. in form of an adhesive tape, may be inserted into the recess or undercut so that the surrounding parts of the inner side of the base protects the adhesive, once the vortex generator device is mounted on the surface of a wind turbine blade, since the surrounding parts may contact the blade. Accordingly, there is no need for subsequently sealing the edges of the base of the vortex generator strip.

According to an advantageous embodiment, an adhesive film or strip, such a double adhesive tape or strip, is arranged within the recess of the inner side. This provides a particular simple solution, where the adhesive may be pre-applied to the vortex generator device.

In one embodiment, the adhesive film or strip comprises a layer of compressible material, such as a layer of foamed polymer or foam cells. Thereby, the adhesive film or layer is better adapted to conform to the surface of the wind turbine blade. Advantageously, the adhesive film or strip is covered by a peel-off layer. Thereby, the adhesive film or strip may be protected in order to maintain the adhesion of the film until the strip is mounted on a wind turbine blade.

In one advantageous embodiment, the adhesive is acrylic based. The adhesive may for instance be pressure sensitive, thereby providing a simple solution when fitting the vortex generator device to the surface of a wind turbine blade, as the worker only has to apply pressure to the base of the vortex generator device.

In another advantageous embodiment, the vortex generating means protrude from the outer side of the base. The vortex generating means may for instance be vane vortex generators, i.e. fins protruding from the outer side.

In yet another advantageous embodiment, the base comprises a first perimeter and wherein the recess comprises a second perimeter, the second perimeter having a spacing to the first perimeter. Thereby a small wall surrounds the entire recess, thus protecting the adhesive in the recess. The first perimeter may be substantially parallel to the second perimeter.

In one advantageous embodiment, a height of the first vane and/or the second vane increases from the second side towards the first side, at least along a part of said vanes. The shape of the first vane and/or the second vane may for instance be substantially triangular or wedge-shaped. However, the shape may deviate from this form by for instance having a somewhat flattened top and the derivative of the height may for instance increase or decrease from the second side towards the first side. However, in general, the vane will have a minimum height at the second side (or equivalently a leading edge side) and its maximum height near the first side (or equivalently a trailing edge side) of the base. The vane(s) may be formed integrally with the base. Alternatively, the base and vanes may be manufactured as separate parts which are subsequently coupled or adhered to each other.

A perimeter or rim of the base may be tapered or rounded in order to obtain a gradual transition to the surface of the wind turbine blade. The vortex generator device may be made of wood, aluminum or stainless steel. However, according to an advantageous embodiment, the vortex generator is made of a polymer material, such as TPU, PBT, PET or LDPE. The vortex generator device may also be made of polycarbonate (PC) or a combination of PBT and PC.

Additional sealant may of course in principle be added to the rim of the base. However, the recess or undercut removes this necessity.

According to a second aspect, the invention provides a kit of parts comprising vortex generator devices according to any of the aforementioned embodiments and being of different sizes, e.g. two or three sizes. The kit of parts may for instance comprise vortex generators having two different heights, one set of vortex generator having a first height and a second set of vortex generators having a second height. The second height may approximately be a factor 1.5 or 2 of the first height. Similarly, the kit of parts may comprise a third set of vortex generators having a third height. The third height may approximately be a factor 3 of the first height.

In an advantageous embodiment, the inner side of the base is concave between the first side and the second side. Thus, the vortex generator device is adapted to conform to a curved surface, such as the surface of a wind turbine blade. The entire base, i.e. both the inner side and the outer side, may of course be curved, but the two sides need not have the same curvature. The curvature may be set as an average of the curvature of blade sections, for which the devices are intended so as to be pre-curved to fit to a large number of different blades and/or blade sections. The adhesive film or strip comprises a layer of compressible material may be used for compensating for variations so as to exactly fit to the curvature of the blade.

According to one advantageous embodiment, the vane further comprises a trailing edge portion located nearest the trailing edge side of the vane, which is tapered towards the trailing edge side of the vane, and/or the vane is tapered towards a top part of the vane.

Thus, it is clear that the vane has a trailing edge part, in which the height of the vane decreases towards the trailing edge side, and/or that the thickness of the vane, i.e. the distance between a first side and a second side of the vane, decreases towards a top portion of the vane. Thereby, it is possible to manufacture the vortex generator device by moulding and ensuring that the moulded vortex generator device may be released from the mould without parts of the vortex generator device breaking apart. At the same time, the functionality of the vortex generator device is not impaired compared to conventional vortex generator devices having a triangular shaped vane with a non-tapered trailing edge and non-tapered thickness.

Accordingly, the vortex generator device may according to an advantageous embodiment be moulded.

According to an advantageous embodiment, the vortex generator device is made of a metal, such as aluminum or stainless steel, or a polymer material, such as TPU, PBT, PET or LDPE, polycarbonate (PC), or a combination of PBT and PC.

According to another advantageous embodiment, the trailing edge portion forms an average trailing edge tapering angle to a surface normal to the base in an interval between 1 and 20 degrees, or between 1 and 15 degrees, or between 1 and 10 degrees.

Advantageously, the average trailing edge tapering angle is between 4 and 8 degrees, e.g. around 6 degrees. Of course, the trailing edge portion should also form the same angle to a surface normal to the wind turbine blade, when mounted on a surface of the wind turbine blade. The term "average angle" is used, since the trailing edge portion may be slightly curved.

According to one embodiment, the trailing edge portion is substantially straight. Thus, the entire trailing edge part is tapered with a tapering angle that forms the trailing edge tapering angle to a surface normal.

According to another advantageous embodiment, sides of the vane form a thickness-tapering angle between 0.5 and 5 degrees, or between 0.5 and 3.5 degrees, or between 0.5 and 2 degrees. Thus, the vane is substantially tapered towards a top portion of the vane.

In yet another advantageously embodiment, the first vane and the second vane are tilted towards each other, each forming a tilt angle to a surface normal being between 0.5 and 3 degrees. Thus, the first vane and the second vane are slightly inclined towards each other.

Advantageously, the leading edge portion extends along at least 50%, or at least 60%, or at least 70%, or at least 75% of a total length of the vane. The leading edge portion may even extend along at least 80% or 85% of the total length of the vane.

According to another advantageous embodiment, the vane, i.e. the first vane and/or the second vane, comprises a flattened top portion. The vane may for instance have an intermediate portion, where the height of the vane is substantially constant. However, this part may also be slightly rounded or the like.

According to a third aspect, the invention provides a kit of parts comprising an intermediate product according to any of the aforementioned embodiments and a masking film adapted for application onto an outer surface of a wind turbine blade and provided with openings corresponding to the intended positions of the flow-altering devices on the surface of the wind turbine blade.

According to an advantageous embodiment, the masking film comprises an inner removal film part surrounding the openings.

According to a fourth aspect, the invention provides a kit of parts comprising an intermediate product according to any of the aforementioned embodiments and a number of mounting reference strings. Additionally, the kit of parts may comprise tape for mounting the strings to an exterior of the wind turbine blade.

Figure 2:
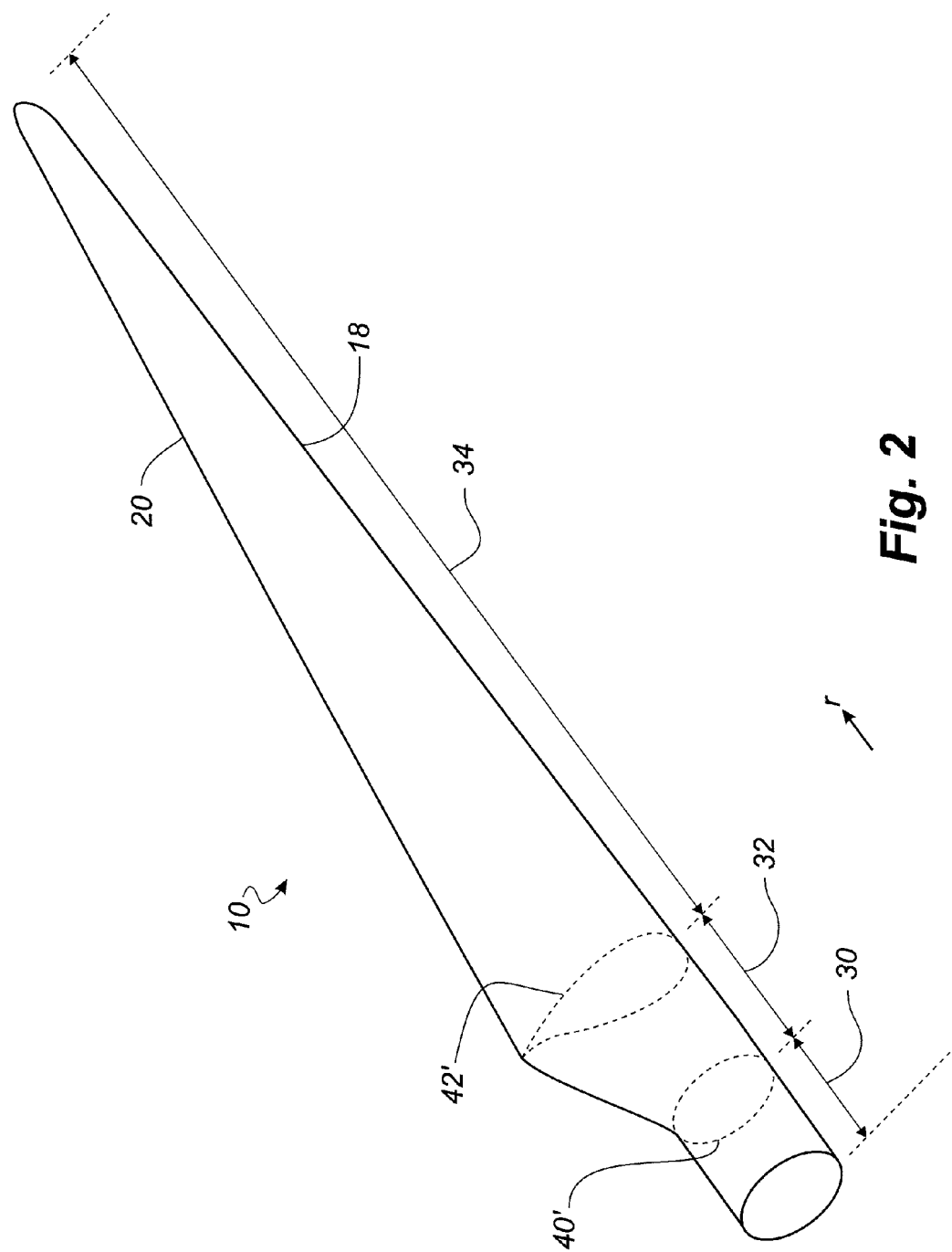
Figure 3:
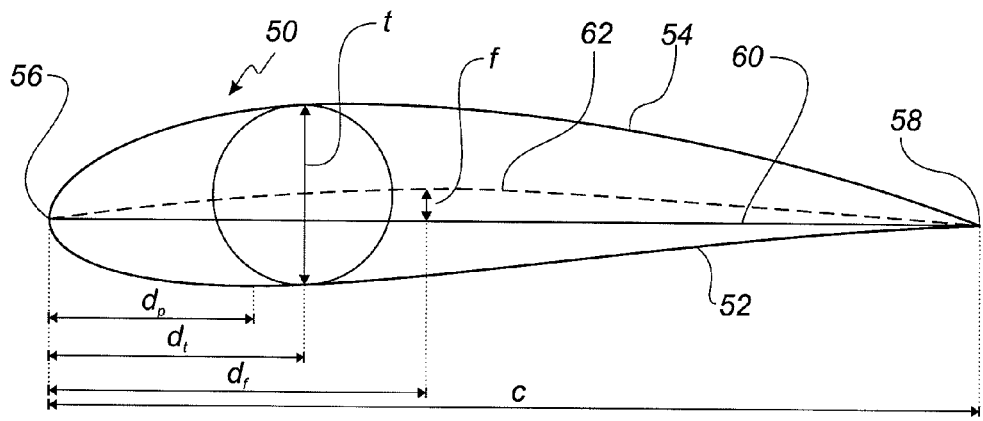
Figure 4:
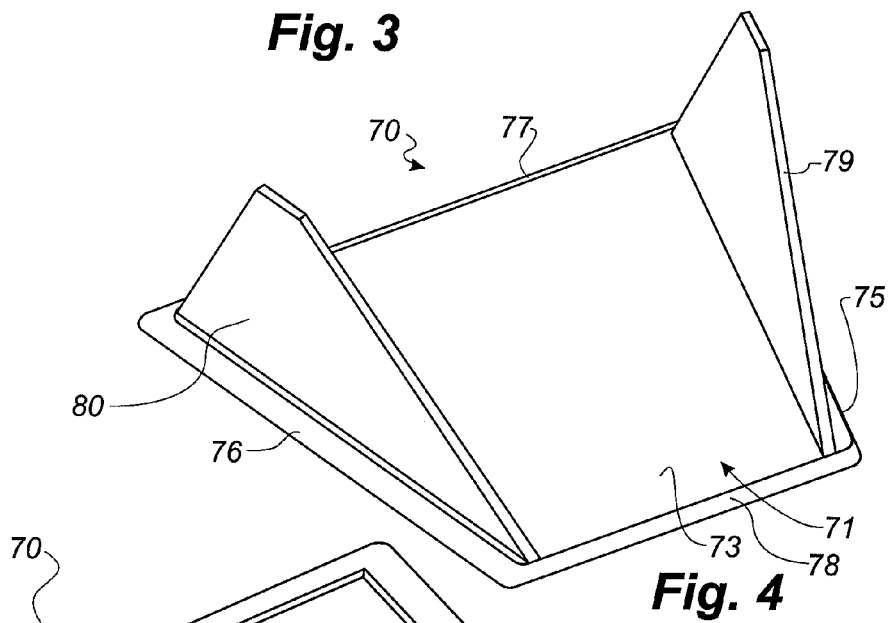
Figure 5:
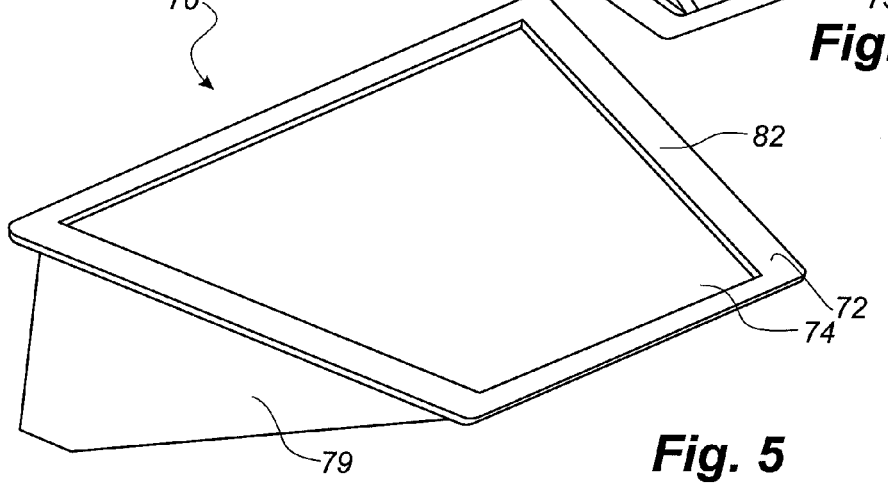
Figure 6:
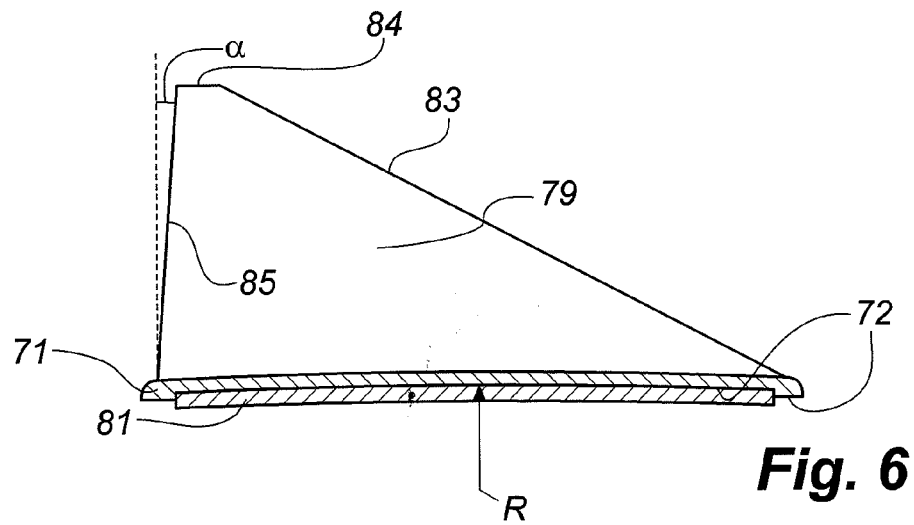
Figure 7:
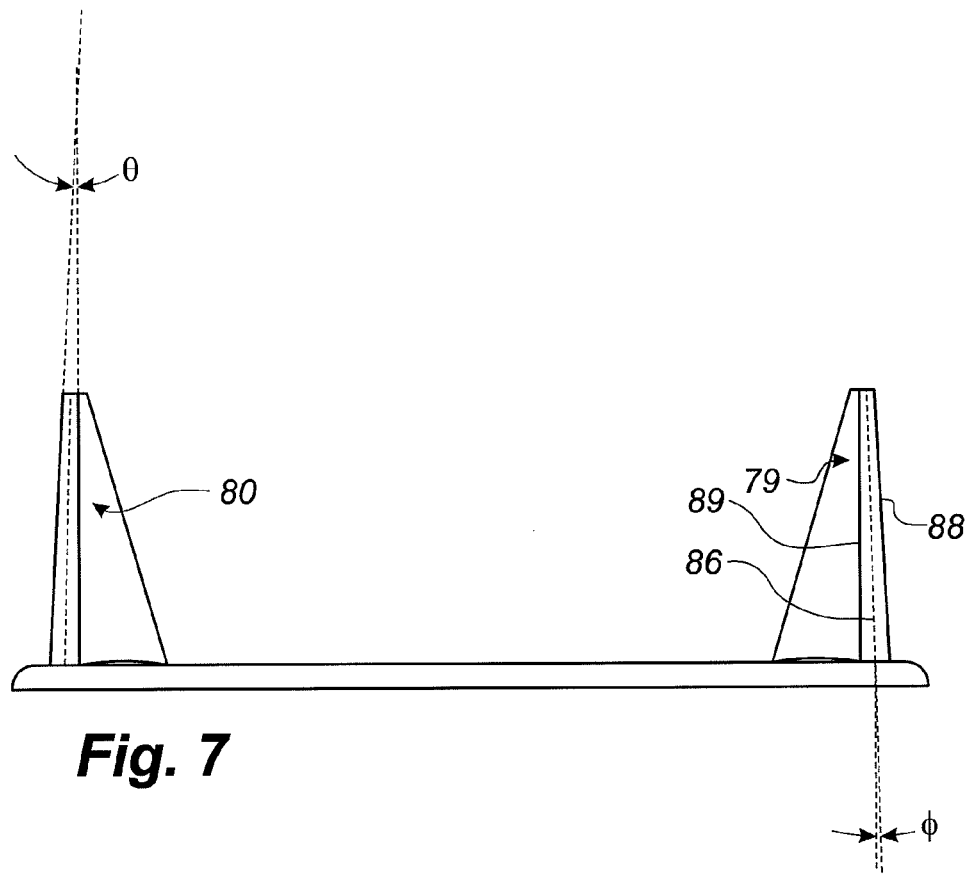
Figure 10:
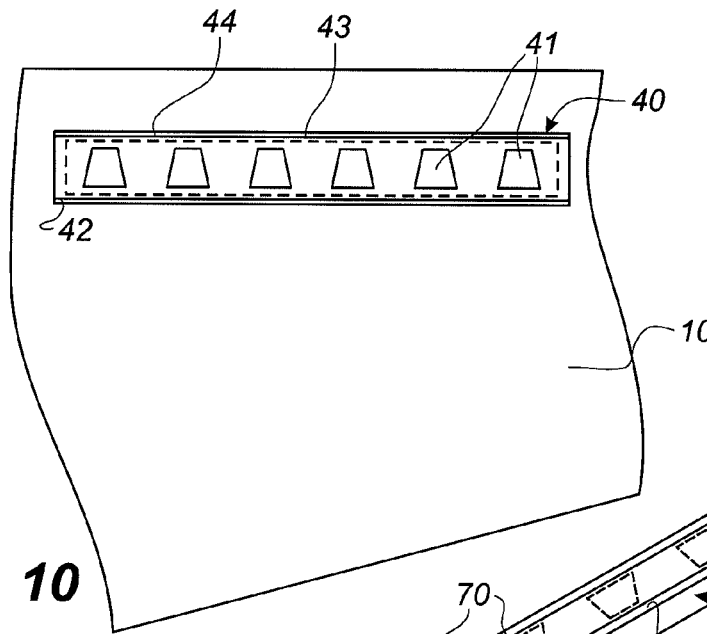
Figure 11:
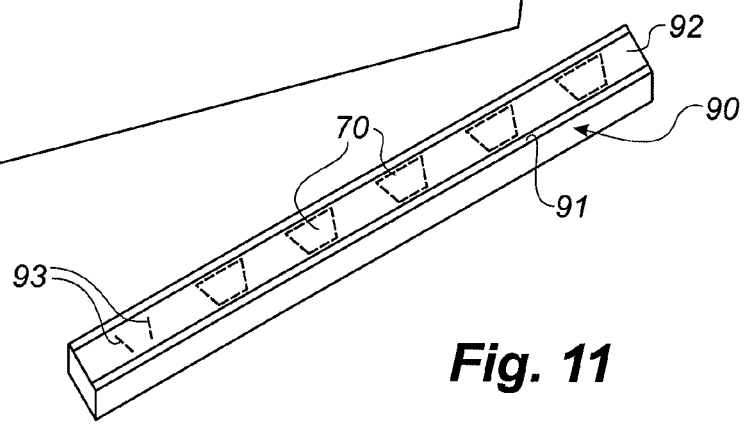
Figure 12:
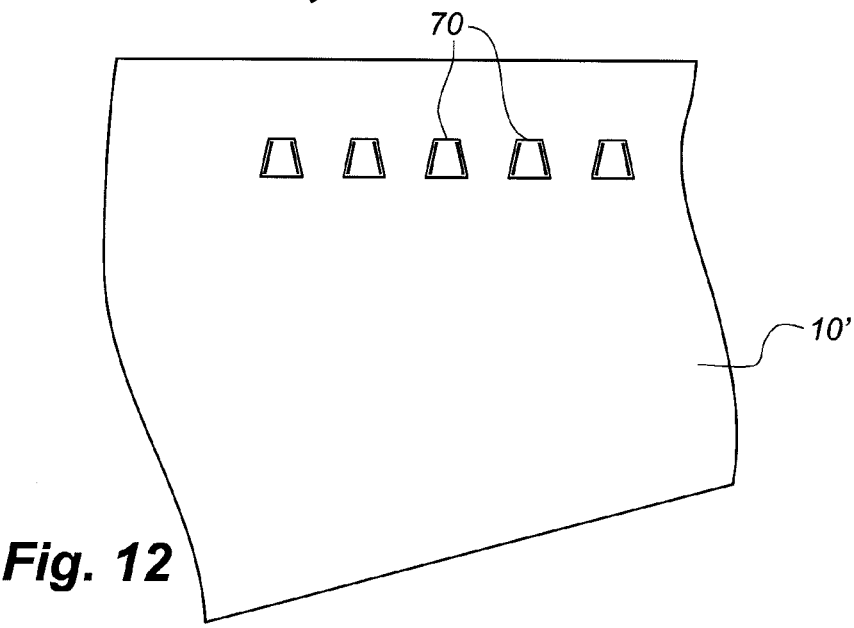
Figure 13:
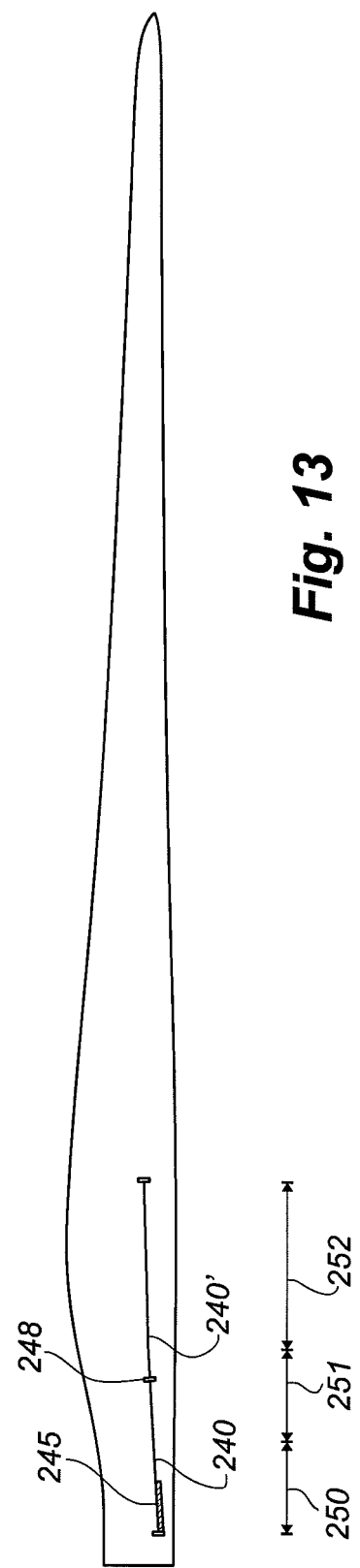

The invention is explained in detail below with reference to an embodiment shown in the drawings, in which FIG. 1 shows a schematic view of a wind turbine, FIG. 2 shows a schematic view of a wind turbine blade, FIG. 3 shows a schematic view of an airfoil profile, FIG. 4 shows a schematic top view of a vortex generator device according to the invention, FIG. 5 shows a schematic bottom view of the vortex generator device according to the invention, FIG. 6 shows a cross section of the vortex generator device according to the invention, FIG. 7 shows another side view of the vortex generator device according to the invention, FIGS. 8a-h show different shapes of vanes for vortex generator devices according to the invention, FIG. 9 shows a wind turbine blade being retrofitted with vortex generator devices according to the invention, FIG. 10 shows a wind turbine blade section provided with a masking film according to the invention, FIG. 11 shows a perspective view of a mounting plate according to the invention provided with vortex generator devices, FIG. 12 shows the wind turbine blade section after vortex generator devices have been fitted to the surface of the wind turbine blade, and FIG. 13 shows the use of alignment strings.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub.

The diameter (or the chord) of the root region 30 is typically constant along the entire root area 30. The transition region 32 has a transitional profile 42' gradually changing from the circular or elliptical shape 40' of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this most often being the case in order to compensate for the local velocity of the blade being dependent on the radius from the hub.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally faces towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIGS. 4-7 show different views of a vortex generator (VG) device 70 according to the present invention, where FIGS. 4 and 5 show two perspective views, FIG. 6 shows a cross-section of the VG device 70, and FIG. 7 shows a side view seen from a trailing edge side of the vortex generator device.

As seen in FIG. 4, in an advantageous embodiment the vortex generator device 70 is formed as a vane VG device comprising a base 71 having (when mounted to an exterior of the wind turbine blade), an inner side 72 for attaching to the exterior of the wind turbine blade, and an outer side 73 facing away from the exterior of the wind turbine blade. The base 71 further comprises a first side 77 (or trailing edge side) and a second side 78 (or leading edge side), as well as a first end 75 and a second end 76. The base 71 is trapezium-shaped so that the first side 77 is parallel to the second side 78 and so that a length of the second side 78 of the base 71 is smaller than a length of the first side 77 of the base 71. In an advantageous embodiment, the first end 75 and the second end 76 are oriented so that they form a mutual tapering angle of approximately 38 degrees. The base may advantageously be formed with a rounded perimeter as further shown in FIG. 6.

The VG device 70 comprises a vane pair comprising a first vane 79 and a second vane 80, also called fins, which protrude from the outer side 73 of the base 71. The first vane 79 is oriented at and parallel to the first side 75 of the base 71, and the second vane 80 is oriented at and parallel to the second side 76 of the base 71.

FIG. 5 shows a perspective view of the VG device 70, where the inner side 72 of the base 71 can be seen. The inner side 72 of the base 71 is provided with a recess 74 or undercut. The recess 74 has a perimeter, which is parallel to a perimeter of the base 71. Thus, the perimeter of the recess 74 is also trapezium-shaped with sides, which are parallel to the first end 75, second end 76, first side 77 and second side 78 of the base.

The recess 74 is thus surrounded by a surrounding wall 82. The surrounding wall 82 is adapted to protect an adhesive arranged within the recess 74 so that the VG device 70, when mounted on the exterior of the wind turbine blade, does not become ripped loose from the exterior of the wind turbine blade.

FIG. 6 shows a cross-section of the VG device 70, wherein the first vane 79 can be seen. The VG device is depicted with an adhesive strip 81 or tape arranged within the recess 74. It can be seen that the base 71 is curved so that the inner side 72 of the base 71 is concave between the first side 77 and the second side 78 of the base 71 and has a curvature radius R. The curvature radius is chosen as an average of the curvature of blade sections, for which the particular VG device 70 is intended so as to be pre-curved to fit to a large number of different blades and/or blade sections. Advantageously, the adhesive strip 81 comprises at least an adhesive outer layer for mounting on the exterior of the wind turbine blade and a layer of compressible material, such as a layer of foamed polymer or foam cells.

The adhesive strip 81 is thus adapted for compensating for variations so as to exactly fit or conform to the curvature of the exterior of the blade. The curvature of the inner side 72 of the base 71 and the outer side 73 of the base 71 need not be the same.

Further, FIG. 6 shows the shape of the vanes. It can be seen that the vanes comprises a leading edge portion 83, wherein a height of the vane increases from the second side 78 towards the first side 77 of the base 71, an intermediate portion or top portion 84, wherein a height of the vane is substantially constant, and a trailing edge portion 85, wherein a height of the vane is decreasing towards the first side 77 of the base 71. In the depicted embodiment, the vane comprises a substantially straight trailing edge portion 85, i.e. so that the height of the vane linearly decreases along this portion. Thus, the trailing edge portion 85 is tapered so that the vane forms a trailing edge tapering angle α with a surface normal to a plane of the base 71 (and the exterior of the wind turbine blade). The trailing edge tapering angle α is advantageously around 6 degrees.

FIG. 7 shows a side view of the VG device seen from first side 77 of the base 71. It can be seen that the vanes are tapered so that first sides 88 and second sides 89 of the vanes are tapered towards a top portion of the vanes with a thickness-tapering angle θ. The thickness-tapering angle θ may for instance be between 1 and 2 degrees.

Further, the first vane 79 and the second vane 80 may be inclined towards each other so that a first tilt axis 86 of the first vane 79 and a second tilt axis of the second vane 80 both form a tilt angle φ to a surface normal being between for instance between 0.5 and 1 degrees. However, the vanes 79, 80 may advantageously protrude perpendicularly from the base 71 (and the exterior of the wind turbine blade).

The VG device is provided with the thickness-tapering angle θ and the trailing edge tapering angle α, as well as the optional tilt angle φ so that the VG device 70 may be moulded in a single piece and still be released from the mould without parts of the VG device 70 braking off. At the same time, the function of the VG device 70 is not impaired compared to conventional VG devices. In an advantageous embodiment, the VG device is moulded as a unitary element made in a combination of PBT and polycarbonate.

The embodiment has here been shown as a single VG vane pair on a trapezium-shaped base. However, it is recognised that the VG device includes several inventive concepts, e.g. the use of the recess, the tapering and tilt angles so as to be able to mould the VG device, and the use of a trapezium-shaped base. Thus, it is recognised that other embodiments utilising these inventive concepts may be contemplated.

With respect to the moulded VG device, it is for instance not necessary that the device comprises exactly one VG vane pair. The moulded VG device may for instance instead be formed as a strip comprising a plurality of VG vane pairs, or be formed with only a single vane arranged on a foot.

This is also the case for the VG device with the recess on the inner side of the base, where it is recognised that the device may be formed as a strip comprising a plurality of VG pairs. Also, it is recognised that this idea may be used for other flow guiding devices with parts protruding from an outer side of the strip/base, such as spoilers, Gurney flaps or the like.

Further, it is recognised that the vane may have various shapes. Thus, the vane may for instance has a shape as a right triangle as shown in FIG. 8*a*, or it may comprise a tapered trailing edge part with a flattened top as shown in FIG. 8*b* or without a flattened top in FIG. 8*c*. The vane may also comprise an intermediate section having a different tapering angle as shown in FIG. 8*d*, or a rounded top portion as shown in FIG. 8*e*. The leading edge part of the vane may comprise a straight top part as shown in FIGS. 8*a-e*, or a concave top part as shown in FIG. 8*f* or a convex top part as shown in FIG. 8*g*. The trailing edge part may also be concave or convex as shown in FIG. 8*h*. Yet again the shape may take any combination of said sections shown in the embodiments of FIG. 8.

FIG. 9 illustrates a wind turbine 102 comprising a tower 104, a nacelle 106 and a rotor with a substantially horizontal rotor shaft. The rotor includes a hub 108 and three blades 110 extending radially from the hub 108. The rotor is stopped in a position, where one of the blades 110 is positioned substantially vertical with a tip end 114 pointing towards ground. Furthermore, the wind turbine blade 110 is pitched to a break position. A worker 185 is working on the wind turbine blade 110 and is hoisting down along the trailing edge of the blade 110 via a work platform 187 and a hoisting arrangement 186. The hoisting arrangement 186 comprises wires, which are connected (not shown) near the root of the wind turbine blade 110, e.g. to the hub 108 of the wind turbine 102.

According to another embodiment, the worker can use a cherry picker for getting access to the blade. Yet again, the worker may rappel down along the blade from a position above an area of application.

In the following, a method and tools according to the invention for retrofitting the VG devices 70 to the exterior of a wind turbine blade is explained with reference to FIG. 10-13.

FIG. 10 shows a blade section 10', which is to be retrofitted with VG devices 70 according to the invention. In the shown embodiment, the VG devices 70 are to be arranged near a leading edge of the blade section 10'.

In a first embodiment, a masking film 40 is used for carefully aligning and arranging the VG devices 70 at a correct position on the blade section 10'. The masking film 40 comprises a number of openings 41, a peel-off layer 42 covering the openings 41, and an inner removal film. The retrofitting method begins with a worker applying a masking film 40 to the exterior of the blade section 10' at an area of application. Afterwards, the worker removes the peel-off layer 42, thus exposing the openings 41 of the masking film. Then the exterior of the blade is prepared for attaching the VG devices 70. This may be carried out by grinding, polishing, sanding or the like, and optionally cleaning the blade section afterwards. Due to the use of opening 41 corresponding to intended positions of the VG devices 70, it is possible to prepare only the areas, where the VG devices 70 are to be arranged or positioned. Thereby, the grinding, sanding or polishing of the surface will not inadvertently damage surrounding areas on the outer surface of the blade. Further, it is possible to inspect the surface of the blade prior to adhering the flow-altering devices to the surface of the blade in order ensure that the VG devices 70 will be arranged in the correct position.

After preparation of the exterior of the blade section 10', the inner removal film 43 is removed. Thus, it is ensured that the VG devices 70 will not inadvertently adhere to the masking film 40 instead of to the outer surface of the wind turbine blade. Further, the remaining part 44 of masking film 40 may function as a marker to indicate the correct area for applying a mounting plate 90, which is shown in FIG. 11.

The mounting plate 90 is made of for instance an open-celled foam or another foamed polymer. A number of VG devices 70 according to the invention are inserted into a first side 91 of the mounting plate in such a way that the vanes of the VG devices 70 are inserted into the mounting plate 90 and the inner side of the VG devices are exposed from the first side 91 of the mounting plate 90. The mounting plate 90 may be provided with cuts or slots 93, or be moulded with holes for inserting the vanes of the VG devices 70. However, the mounting plate may for instance also consist of two separate plate parts, which are assembled so as to fit around the vanes of the VG devices 70.

The mounting plate 90 further comprises a peel-off layer 92, which is removed prior to retrofitting the VG devices 70 to the exterior of the blade section 10'. The VG devices 70 are then adhered with the inner side of the VG devices 70 to the exterior of the blade section 10' by applying the first side 91 of the mounting plate 90 onto the area of application on the exterior of the blade section 10', after which the mounting plate 90 is removed, thus—as shown in FIG. 12—leaving the VG devices 70 on the exterior of the blade section 10' due to the use of the adhesive strips in the recesses of the VG devices 70. The VG devices 70 may simply be adhered to the exterior of the blade section 10' by applying pressure to the mounting plate 90.

Additional VG devices 70 may be adhered to the exterior of the blade by repeating the above steps. In an advantageous embodiment, outermost cuts or holes 93 of the mounting plate for inserting a VG device 70 may be left void as shown in FIG. 11. Thereby, these slots 93 may be inserted over one of the already retrofitted VG devices. Thus, the spacing between an outermost already retrofitted VG device and an adjacent later retrofitted VG device may be preset. Thus, a simple method of retrofitting additional VG devices in direct extension of already retrofitted VG devices is provided.

In practice it may be difficult to apply the masking film 40 to the exterior of the blade section 10', in particular if the VG devices 70 are to be retrofitted in situ of a wind turbine, since the film may be difficult to control due to wind gusts and the like. Therefore, according to another embodiment shown in FIG. 13, a simple setup using mounting reference string(s) 240, 240' may be utilised instead. The mounting reference strings 240, 240' may be aligned with predetermined positions on the exterior of the blade so as to flush with an area of application 245 for adhering of the VG devices.

The mounting reference strings 240, 240' may be applied to the surface of the blade by use of tape 248. The VG devices 70 are then adhered to the exterior of the blade in a similar manner as in the previously described embodiment.

The blade may comprise a first longitudinal section 250 nearest the root of the blade, a third longitudinal section 252 nearest the tip of the blade, and an intermediate second longitudinal section 251 between the first longitudinal section 250 and the third longitudinal section 252. The three longitudinal sections 250, 251, 252 may be provided with VG devices of different sizes. In the embodiment depicted in FIG. 13, the three longitudinal sections 250, 251, 252 extend along a part of the root section of the blade, the transition region of the blade and an innermost part of the airfoil section. However, it is readily recognised that the longitudinal sections comprising different VG devices may be located differently and that the extent of the longitudinal sections will vary from blade type to blade type. It is also possible to use only two longitudinal sections and thus only two types of VG devices. Yet again, it may be possible to use four, or even five longitudinal sections and a corresponding number of different VG devices.

In practice, it has shown to be sufficient to use only three different types of VG devices for retrofitting in order to cover a number of different blade sections and blade types, viz.:

| Type  | Total height | Height of base | Recess height | Curvature R |
|-------|--------------|----------------|---------------|-------------|
| VG 10 | 10 mm        | 1.3 mm         | 0.35 mm       | 500 mm      |
| VG 20 | 20 mm        | 2.0 mm         | 0.8 mm        | 1001 mm     |
| VG 30 | 30 mm        | 2.0 mm         | 0.8 mm        | 1501 mm     |

The invention claimed is:

1. A method of retrofitting flow guiding devices to an outer surface of a wind turbine blade, the flow-guiding devices being of the type having a base comprising an inner side for attaching onto the surface of the wind turbine blade, and an outer side with protruding flow guiding device parts, wherein the method comprises the steps of:
   a) inserting the protruding flow guiding device parts into a mounting plate so that the inner side of the flow-guiding devices are exposed from a first side of the mounting plate,
   b) adhering the inner side of the flow guiding devices to the surface of the wind turbine blade by applying the first side of the mounting plate onto an area of application on the surface of the wind turbine blade, and
   c) removing the mounting plate from the area of application on the surface of the wind turbine blade.

2. A method according to claim 1, wherein the flow guiding devices are vortex generator devices or turbulence-generating devices.

3. A method according to claim 2, wherein the flow guiding devices are vane vortex generators.

4. A method according to claim 1, wherein the inner side of the base of the flow guiding devices are provided with an adhesive film, which is covered by a peel-off layer, and wherein the method comprises the step of removing the peel-off layer prior to step b).

5. A method according to claim 4, wherein the adhesive film is a double adhesive tape.

6. A method according to claim 1, the flow-guiding devices being arranged with a predetermined mutual spacing along the mounting plate.

7. A method according to claim 1, wherein the area of application is prepared for adhesion prior to step a).

8. A method according to claim 7, wherein a masking film is applied to the surface of the wind turbine blade prior to step b), the masking film being provided with openings corresponding to intended positions of the flow guiding devices on the surface of the wind turbine blade, wherein the masking film optionally comprises an inner removal film part surrounding the openings, and wherein the method comprises removal of the inner removal film part prior to step a), and wherein the masking film advantageously is removed from the surface of the wind turbine blade after step b).

9. A method according to claim 1, wherein a mounting reference string is arranged on the outer surface of the blade prior to step b).

10. A method according to claim 1, comprising an additional mounting plate having additional flow-guiding devices exposed from a first side thereof, and further at an end thereof comprising an opening for receiving a flow-guiding device already mounted on the surface of the wind turbine blade, and wherein the method further comprises the step of inserting the already mounted flow-guiding device into the opening, and subsequently adhering the additional flow-guiding devices in the same manner as step b).

11. A method according to claim 1, wherein the retrofitting is carried out in situ on the wind turbine blade, which is installed on the rotor of a wind turbine.

12. A method according to claim 11, wherein the blade is positioned in a substantially vertical position with a tip end pointed towards the ground, and wherein a worker prior to step b) is hoisted down along the wind turbine blade from a point above the area of application, alternatively hoisted up from a point below the area of application.

13. An intermediate product comprising:
   a mounting plate (90) having a first side (91) and a second side, and
   a number of flow guiding devices (70) comprising:
      a base (71) having, when mounted on a surface of a wind turbine blade, an inner side (72) for attaching onto the surface of the wind turbine blade, and an outer side (73) with protruding flow guiding device parts (79, 80), wherein the protruding device parts (79, 80) are inserted into the first side (91) of the mounting plate (90) so that the inner side (72) of the flow-guiding devices (70) is exposed from a first side (91) of the mounting plate (90).

14. Intermediate product according to claim 13, wherein the mounting plate is at least partially made of a foamed polymer.

15. Intermediate product according to claim 13, wherein the flow guiding devices are a vane vortex generator.

16. Kit of parts comprising an intermediate product according to claim 13 and a masking film (40) adapted for application onto an outer surface of a wind turbine blade and provided with openings (41) corresponding to the intended positions of the flow guiding devices (70) on the surface of the wind turbine blade.

* * * * *